United States Patent
Jurik et al.

(10) Patent No.: US 10,724,709 B2
(45) Date of Patent: Jul. 28, 2020

(54) COORDINATED EFFECTS SYSTEM FOR AN AUTOMATED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/113,902

(22) Filed: Aug. 27, 2018

(65) Prior Publication Data

US 2018/0363885 A1    Dec. 20, 2018

Related U.S. Application Data

(63) Continuation-in-part of application No. 15/516,399, filed as application No. PCT/US2015/053566 on Oct. 1, 2015.
(Continued)

(51) Int. Cl.
*F21V 14/06* (2006.01)
*F21V 5/02* (2006.01)
(Continued)

(52) U.S. Cl.
CPC .............. *F21V 14/06* (2013.01); *F21V 5/02* (2013.01); *G05B 19/23* (2013.01); *F21S 10/007* (2013.01);
(Continued)

(58) Field of Classification Search
CPC ... F21V 14/06–085; F21V 5/02; F21S 10/007
See application file for complete search history.

(56) References Cited

U.S. PATENT DOCUMENTS 3,584,226 A *   6/1971   Lerner ................ G06M 1/101
                                                     250/221
4,891,738 A    1/1990   Richardson et al.
(Continued)

FOREIGN PATENT DOCUMENTS

CN          1711441 A     12/2005
CN        101430073 A      5/2009
(Continued)

OTHER PUBLICATIONS

European Extended Search Report; Application No. 18192006.7; dated Nov. 26, 2018; 6 pages.
(Continued)

*Primary Examiner* — Evan P Dzierzynski
(74) *Attorney, Agent, or Firm* — Conley Rose, P.C.; Grant Rodolph; Brooks W Taylor

(57) ABSTRACT

A coordinated effects system and automated luminaire are provided. The automated luminaire includes a light source, an optical device, a first prism system, a second prism system, and a control system. The light source is configured to emit a light beam. The optical device is configured to produce a first image in the light beam. The first and second prism systems include corresponding first and second pluralities of prisms and are configured to position selected ones of their respective prisms in the light beam or to remove all of their prisms from the light beam. The first prism system is configured to rotate the selected one of its prisms to produce a modified image from the image. The second prism system is configured to rotate the selected one of its prisms to produce an output image from the modified image. The control system is configured to control the first and second prism systems.

11 Claims, 12 Drawing Sheets

Related U.S. Application Data

(60) Provisional application No. 62/058,562, filed on Oct. 1, 2014, provisional application No. 62/553,565, filed on Sep. 1, 2017.

(51) Int. Cl.
| | |
|---|---|
| *G05B 19/23* | (2006.01) |
| *F21W 131/406* | (2006.01) |
| *F21V 5/00* | (2018.01) |
| *F21S 10/00* | (2006.01) |

(52) U.S. Cl.
CPC ........ *F21V 5/008* (2013.01); *F21W 2131/406* (2013.01)

(56) References Cited

U.S. PATENT DOCUMENTS

| | | | | |
|---|---|---|---|---|
| 4,980,806 | A * | 12/1990 | Taylor | G05B 19/0421 |
| | | | | 315/316 |
| 5,537,303 | A * | 7/1996 | Stacy | F21S 10/007 |
| | | | | 362/284 |
| 5,934,794 | A * | 8/1999 | Hutton | F21S 10/007 |
| | | | | 362/283 |
| 6,502,964 | B1 | 1/2003 | Simon | |
| 9,664,361 | B2 * | 5/2017 | Hansen | F21S 10/00 |
| 2006/0187654 | A1 * | 8/2006 | Jungel-Schmid | F21S 8/02 |
| | | | | 362/147 |
| 2008/0055608 | A1 | 3/2008 | Bornhorst | |
| 2009/0268466 | A1 | 10/2009 | Allegri | |
| 2010/0073927 | A1 | 3/2010 | Lewin et al. | |
| 2014/0233238 | A1 | 8/2014 | Quadri et al. | |
| 2016/0195237 | A1 | 7/2016 | Quadri et al. | |
| 2018/0187847 | A1 | 7/2018 | Jurik et al. | |
| 2019/0011820 | A1 | 1/2019 | Nohechi et al. | |

FOREIGN PATENT DOCUMENTS

| | | |
|---|---|---|
| CN | 201416832 Y | 3/2010 |
| CN | 202532389 U | 11/2012 |
| CN | 203010295 U | 6/2013 |
| CN | 103502865 A | 1/2014 |
| CN | 203868942 U | 10/2014 |
| CN | 107002973 A | 8/2017 |
| DE | 102011113036 A1 | 3/2012 |
| EP | 3056804 A1 | 8/2016 |
| KR | 20140143065 A | 12/2014 |
| WO | 9852386 A1 | 11/1998 |
| WO | 2012138770 A2 | 10/2012 |
| WO | 2016054418 A1 | 4/2016 |

OTHER PUBLICATIONS

European Partial Search Report; Application No. 18191994.5; dated Nov. 26, 2018; 11 pages.
Jurik, Pavel, et al.; U.S. Appl. No. 16/118,121, filed Aug. 30, 2018; Title: Framing System for an Automated Luminaire; 44 pages.
"Infinity iB-16R Manual"; https://www.highlite.nl/silver.download/Documents@extem@Manuals/41532_MANUAL_GB_V1.pdf; 2015; 44 pages.
"Infinity iB-2R Manual"; https://www.warmlight.at/media/pdf/41531_MANUAL_GB_V1.pdf; 2014; 36 pages.
Office Action dated May 11, 2018; U.S. Appl. No. 15/516,399, filed Apr. 1, 2017; 6 pages.
Office Action dated Oct. 25, 2018; U.S. Appl. No. 15/516,399, filed Apr. 1, 2017; 17 pages.
Office Action dated Oct. 29, 2018; U.S. Appl. No. 16/118,121, filed Aug. 30, 2018; 14 pages.
PCT International Search Report; Application No. PCT/US2015/053566; dated Mar. 7, 2016; 5 pages.
PCT Written Opinion of the International Searching Authority; Application No. PCT/US2015/053566; dated Mar. 7, 2016; 5 pages.
Chinese Office Action; Application No. 201580065444.6; dated Oct. 8, 2018; 12 pages.
European Examination Report; Application No. 15820914.8; dated Jul. 25, 2018; 6 pages.
Advisory Action dated Jun. 4, 2019; U.S. Appl. No. 15/516,399, filed Apr. 1, 2017; 3 pages.
Advisory Action dated Jun. 4, 2019; U.S. Appl. No. 16/118,121, filed Aug. 30, 2018; 5 pages.
Final Office Action dated Apr. 3, 2019; U.S. Appl.No. 15/516,399, filed Apr. 1, 2017; 24 pages.
Office Action dated Mar. 12, 2019; U.S. Appl. No. 16/118,121, filed Aug. 30, 2018; 27 pages.
European Intention to Grant; Application No. 15820914.8; dated Apr. 11, 2019; 10 pages.
European Extended Search Report; Application No. 18191994.5; dated Feb. 5, 2019; 10 pages.
Final Office Action dated Jan. 29, 2020; U.S. Appl. No. 15/516,399 filed Apr. 1, 2017; 19 pages.
Notice of Allowance dated Mar. 30, 2020; U.S. Appl. No. 16/118,121, filed Aug. 30, 2018; 18 pages.
European Intention to Grant; Application No. 18191994.5; dated Jan. 3, 2020; 11 pages.
Hecht, Eugene; "Chapter 5.5 Prisms"; Optics, 4th Edition; Addison-Wesley; 2002; 8 pages.
Office Action dated Jul. 25, 2019; U.S. Appl. No. 15/516,399, filed Apr. 1, 2017; 17 pages.
Office Action dated Aug. 20, 2019; U.S. Appl. No. 16/118,121, filed Aug. 30, 2018; 28 pages.
Chinese Office Action; Application No. 201580065444.6; dated Jun. 20, 2019; 13 pages.
European Examination Report; Application No. 18191994.5; Jun. 24, 2019; 5 pages.
Chinese Office Action; Application No. 2015800654446; dated Oct. 9, 2019; 11 pages.
Chinese Office Action; Application No. 2018110233256; dated Nov. 21, 2019; 21 pages.
Advisory Action dated Jun. 8, 2020; U.S. Appl. No. 15/516,399, filed Apr. 1, 2017; 5 pages.
Chinese Notification of Allowance; Application No. 201580065444.6; dated Mar. 18, 2020; 5 pages.
Chinese Office Action; Application No. 201811023325.6; dated Apr. 27, 2020; 22 pages.

* cited by examiner

COORDINATED EFFECTS SYSTEM FOR AN AUTOMATED LUMINAIRE

CROSS-REFERENCE TO RELATED APPLICATIONS

This application is a continuation in part of U.S. patent application Ser. No. 15/516,399 filed Apr. 1, 2017 by Pavel Jurik, et al. entitled, "Improved Coordinated Effects System for an Automated Luminaire", which is a U.S. National Stage of International Patent Application No. PCT/US2015/053566 filed Oct. 1, 2015 by Pavel Jurik, et al. entitled, "Improved Coordinated Effects System for an Automated Luminaire", which claims priority to U.S. Provisional Application No. 62/058,562 filed Oct. 1, 2014 by Pavel Jurik, et al. entitled, "System and Method for Controlling the Movement of LEDs in a Luminaire". This application also claims priority to U.S. Provisional Application No. 62/553,565 filed Sep. 1, 2017 by Pavel Jurik, et al. entitled, "Coordinated Effects System for an Automated Luminaire", all of which are incorporated by reference herein as if reproduced in their entirety.

TECHNICAL FIELD OF THE DISCLOSURE

The disclosure generally relates to an effects system in an automated luminaire, and more specifically to a system for coordinating multiple effects within an automated luminaire.

BACKGROUND

Luminaires with automated and remotely controllable functionality are well known in the entertainment and architectural lighting markets. Such products are commonly used in theatres, television studios, concerts, theme parks, night clubs, and other venues. A typical product will commonly provide control over the pan and tilt functions of the luminaire allowing the operator to control the direction the luminaire is pointing and thus the position of the light beam on the stage or in the studio. Typically, this position control is done via control of the luminaire's position in two orthogonal rotational axes usually referred to as pan and tilt. Many products provide control over other parameters such as the intensity, color, focus, beam size, beam shape, and beam pattern. FIG. 1 illustrates a typical multiparameter automated luminaire system 10. These systems typically include a plurality of multiparameter automated luminaires 12 which typically each contain on-board a light source (not shown), light modulation devices, electric motors coupled to mechanical drives systems, and control electronics (not shown). In addition to being connected to mains power either directly or through a power distribution system (not shown), each luminaire 12 is connected is series or in parallel via data link 14 to one or more control desks 15. An operator typically controls the automated luminaire system 10 through the control desk 15.

An optical effect that is commonly used in prior art automated luminaires is often referred to as a prism. This is typically a glass or plastic device placed at a point in the optical train such that it converts a single image produced by the beam color, size, shape, and pattern optical systems into multiple beams for display. For example, a linear prism may convert a single beam into a linear array of identical beams. A diagrammatic example of the effects produced by a prior art prism optical system is shown in FIGS. 2 and 3. In FIG. 2, a single image 20 produced by the beam color, size, shape, and pattern optical systems passes through a prism 21a, resulting in multiple copies of the image 20 as output images 22a. The prism 21a may be rotated as indicated by the arc 23, causing a corresponding rotation in the array of output images as indicated by the arc 24. FIG. 3 shows the same optical system and prism 21a, but with the prism 21a rotated to a new position, resulting in a corresponding rotation of the output images 22b. Image 20 is here shown for clarity as a simple circular image, however the image 20 may be any image, complex or simple, as produced by the automated luminaire, in particular it may have a shape defined by patterns or gobos in the optical train.

In further prior art systems the prism may be different shapes and may be capable of being inserted or removed from the light beam automatically. It may further be possible to select different prisms producing different effects for insertion in the beam. However, the prior art systems are only capable of introducing a single prism at one time.

It would be advantageous to provide a system for an automated luminaire that was capable of introducing a plurality of prisms into the optical effect chain simultaneously such that the effects concatenate. It would further be advantageous to be able to selectively and cooperatively coordinate the insertion, position, and rotation of the plurality of prisms to produce new dynamic lighting effects.

SUMMARY

In a first embodiment, a coordinated effects system includes a first prism system and a second prism system. The first prism system includes a first plurality of prisms, and is configured to position a selected one of its prisms in a light beam passing through the first prism system or to remove all of its prisms from the light beam passing through the first prism system. The first prism system is also configured to rotate at least one of its prisms. The second prism system includes a second plurality of prisms, and is configured to position a selected one of its prisms in the light beam passing through the first prism system or to remove all of its prisms from the light beam passing through the first prism system. The second prism system is also configured to rotate at least one of its prisms.

In a second embodiment, an automated luminaire includes a light source, an optical device coupled to the light source, a first prism system optically coupled to the optical device, a second prism system optically coupled to the first prism system, and a control system. The light source is configured to emit a light beam. The optical device is configured to produce a first image in the light beam. The first prism system includes a first plurality of prisms and is configured to position a selected one of its prisms in the light beam or to remove all of its prisms from the light beam. The first prism system is also configured to rotate the selected one of its prisms to produce a modified image from the image. The second prism system includes a second plurality of prisms and is configured to position a selected one of its prisms in the light beam or to remove all of its prisms from the light beam. The second prism system is also configured to rotate the selected one of its prisms to produce an output image from the modified image. The control system is configured to control the first prism system and the second prism system.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Preferred embodiments are illustrated in the figures, like numerals being used to refer to like and corresponding parts of the various drawings.

Disclosed herein are a coordinated effects system and an automated luminaire. The automated luminaire includes a light source, an optical device, a first prism system, a second prism system, and a control system. The light source is configured to emit a light beam. The optical device is configured to produce a first image in the light beam. The first and second prism systems include corresponding first and second pluralities of prisms and are configured to position selected ones of their respective prisms in the light beam or to remove all of their prisms from the light beam. The first prism system is configured to rotate the selected one of its prisms to produce a modified image from the image. The second prism system is configured to rotate the selected one of its prisms to produce an output image from the modified image. The control system is configured to control the first and second prism systems.

Figure 4:
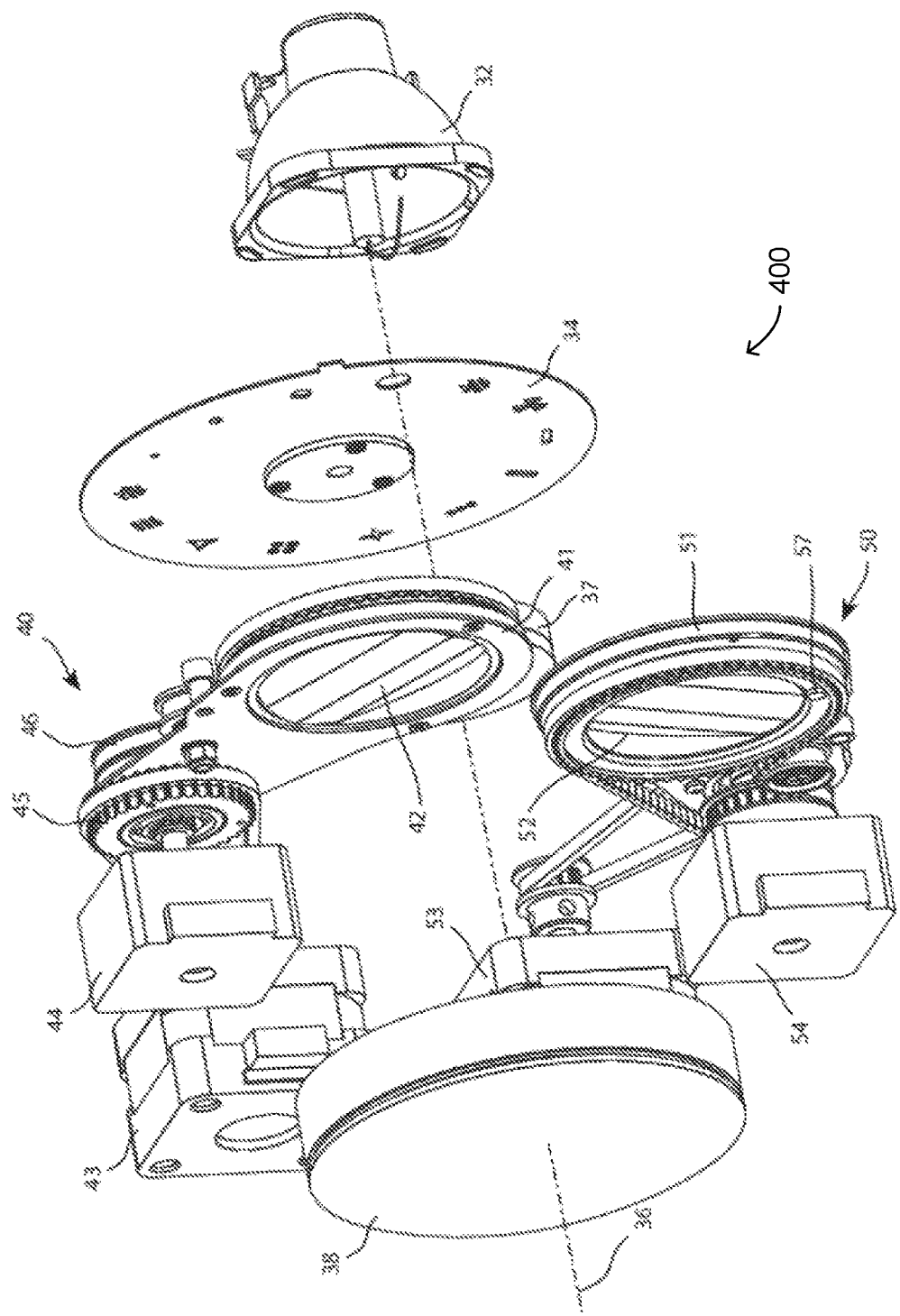
FIG. 4 illustrates an optical system with a first coordinated effects system according to the disclosure in a first configuration.

FIG. 4 illustrates an optical system with a first coordinated effects system 400 according to the disclosure in a first configuration. A light source 32 produces a light beam whose optical axis is shown by dotted line 36. The light beam may pass through gobo wheel 34 and optical lenses 37 and 38 before being emitted from the luminaire. The optical system is shown here much simplified for clarity and, in practice, an automated luminaire may include further optical devices, including but not restricted to, a color wheel, a color mixing mechanism, a rotating gobo, an effects wheel, an iris, a framing shutters mechanism, and other optical devices as known in the art.

The first coordinated effects system 400 includes a first prism system 40. The first prism system 40 comprises a first prism 42 rotatably mounted to a first prism arm 41. A motor 44 is configured to rotate the first prism 42 within first prism arm 41 via a belt 46. Motor 43 is configured to rotate the first prism arm 41 via a gear 45 to insert or remove the first prism 42 into the light beam. The motors 43 and 44 may be operated in a coordinated manner such that the first prism 42 is inserted or removed from the light beam and rotated within the light beam as desired by an operator. The motors 43 and 44 may be of a type selected from, but not restricted to, stepper motor, servo-motor, actuator, solenoid, and other motor types as known in the art. In the configuration shown in FIG. 4, the first prism 42 is positioned outside of the light beam and has no effect on the light beam emitted from the luminaire.

The first coordinated effects system 400 further includes a second prism system 50. The second prism system 50 comprises a second prism 52 rotatably mounted to a second prism arm 51. The motor 54 is configured to rotate the second prism 52 within the second prism arm 51. A motor 53 is configured to rotate the second prism arm 51 to insert or remove the second prism 52 into the light beam. The motors 53 and 54 may be operated in a coordinated manner such that second prism 52 is inserted or removed from the light beam and rotated within the light beam as desired by the operator. The motors 53 and 54 may be of a type selected from, but not restricted to, stepper motor, servo-motor, actuator, solenoid, and other motor types as known in the art. In the configuration shown in FIG. 4, the second prism 52 is positioned outside of the light beam and has no effect on the light beam emitted from the luminaire.

Either or both of the first prism system 40 and the second prism system 50 may include sensors such that the control system of the automated luminaire is aware of, and able to control, the orientation and/or rotation of the first prism 42 and the second prism 52. For example, as illustrated in FIG. 4, the second prism 52 is fitted with a magnet 57 in its periphery that rotates with the second prism 52. A corresponding sensor or sensors (not shown) such as a Hall effect sensor in second prism system 50 may detect the position of magnet 57, and thus sense the rotational position of second prism 52 at the moment the magnet 57 is detected. Similarly, first prism system 40 may be fitted with a magnet and sensor or sensors such that the rotational position of first prism 42 is known and communicated to the control system of the automated luminaire 100. The sensor systems are not restricted to a magnet and Hall effect sensor, and any sensing system may be utilized in other coordinated effects system according to the disclosure, including, but not restricted to, magnetic sensors, optical sensors, and switch sensors.

Figure 1:
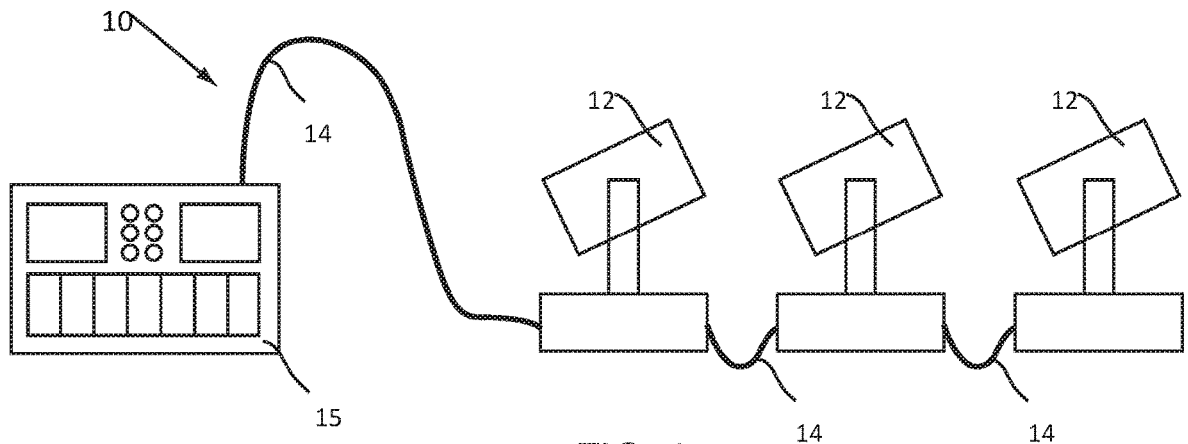
FIG. 1 illustrates a typical prior art automated lighting system.
Figure 2:
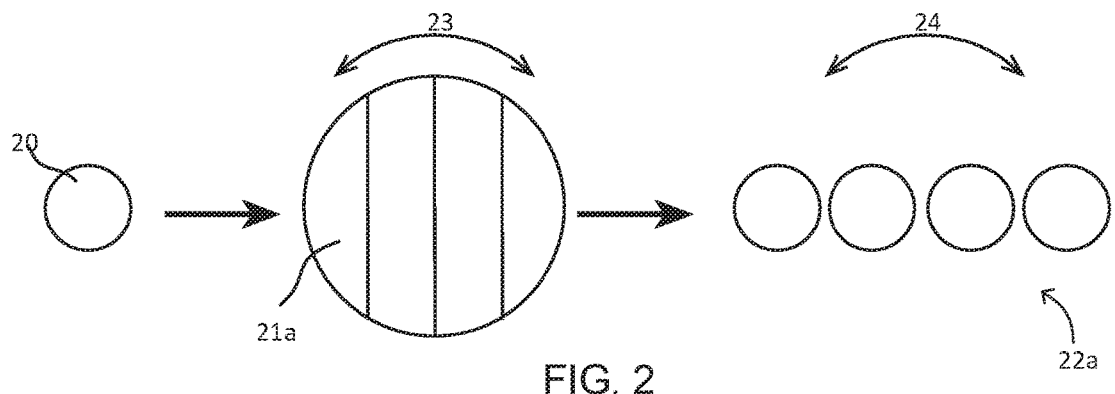
FIG. 2 illustrates a prior art prism effects system.
Figure 3:
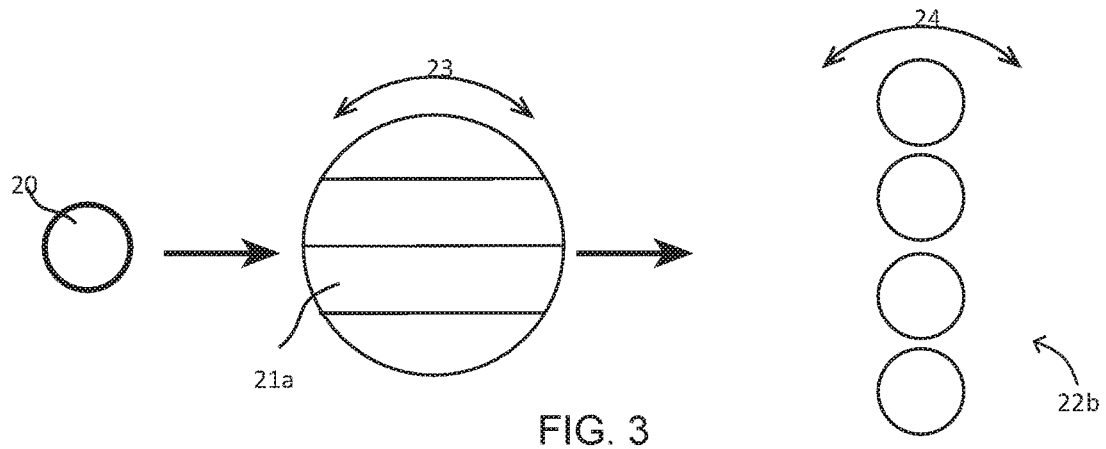
FIG. 3 illustrates a prior art prism effects system.
Figure 5:
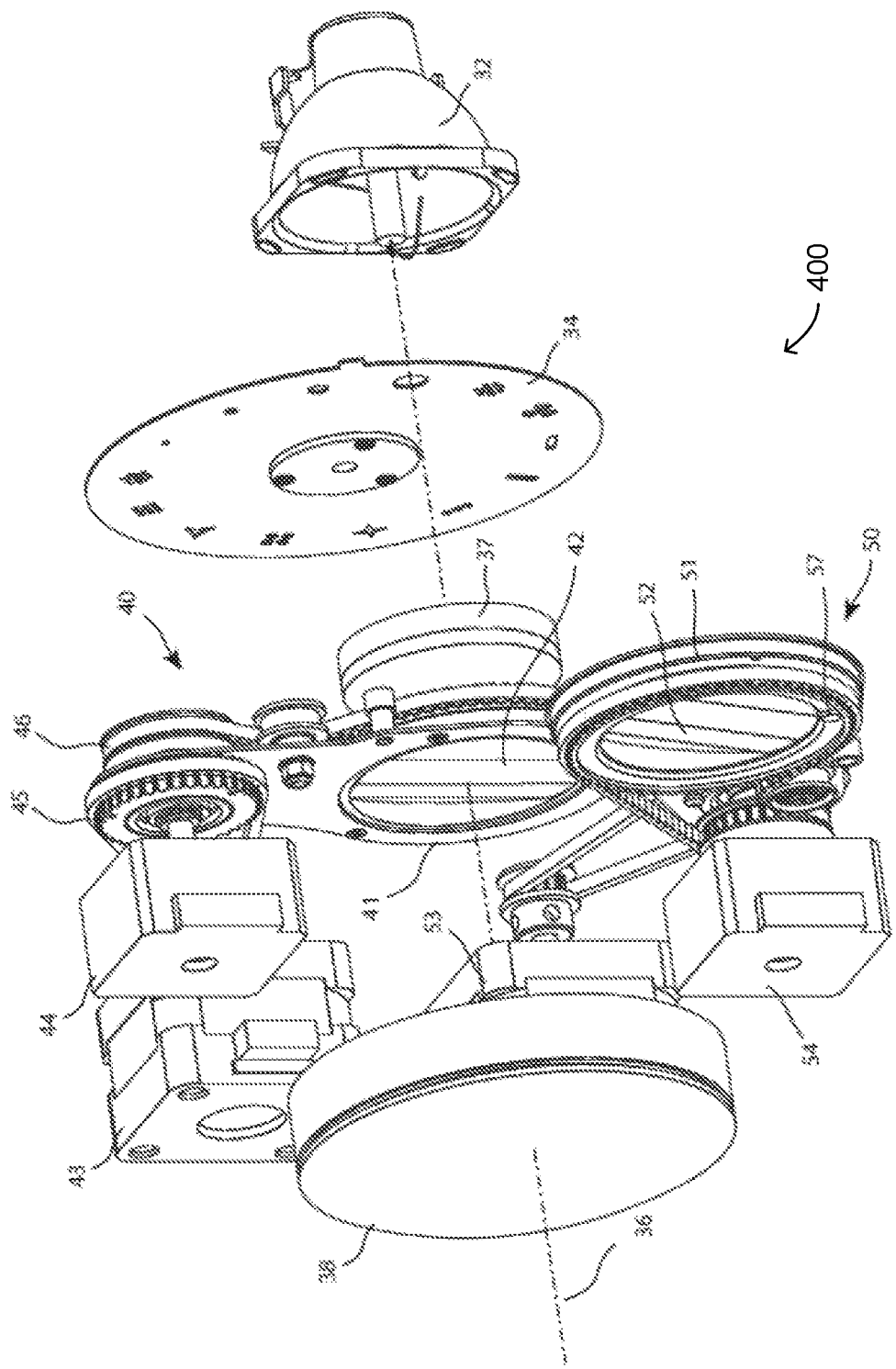
FIG. 5 illustrates the first coordinated effects system of FIG. 4 in a second configuration.

FIG. 5 illustrates the first coordinated effects system 400 in a second configuration. In FIG. 5, the motor 43 has been operated from the configuration shown in FIG. 4 to rotate the first prism arm 41, and thus the first prism 42 has been inserted into the light beam. The second prism 52 remains outside the light beam. In this configuration, the first prism 42 alone will produce an effect in the light beam. The first prism 42 may be rotated while in the light beam by the motor 44, producing effects similar to those illustrated in FIGS. 2 and 3.

Figure 6:
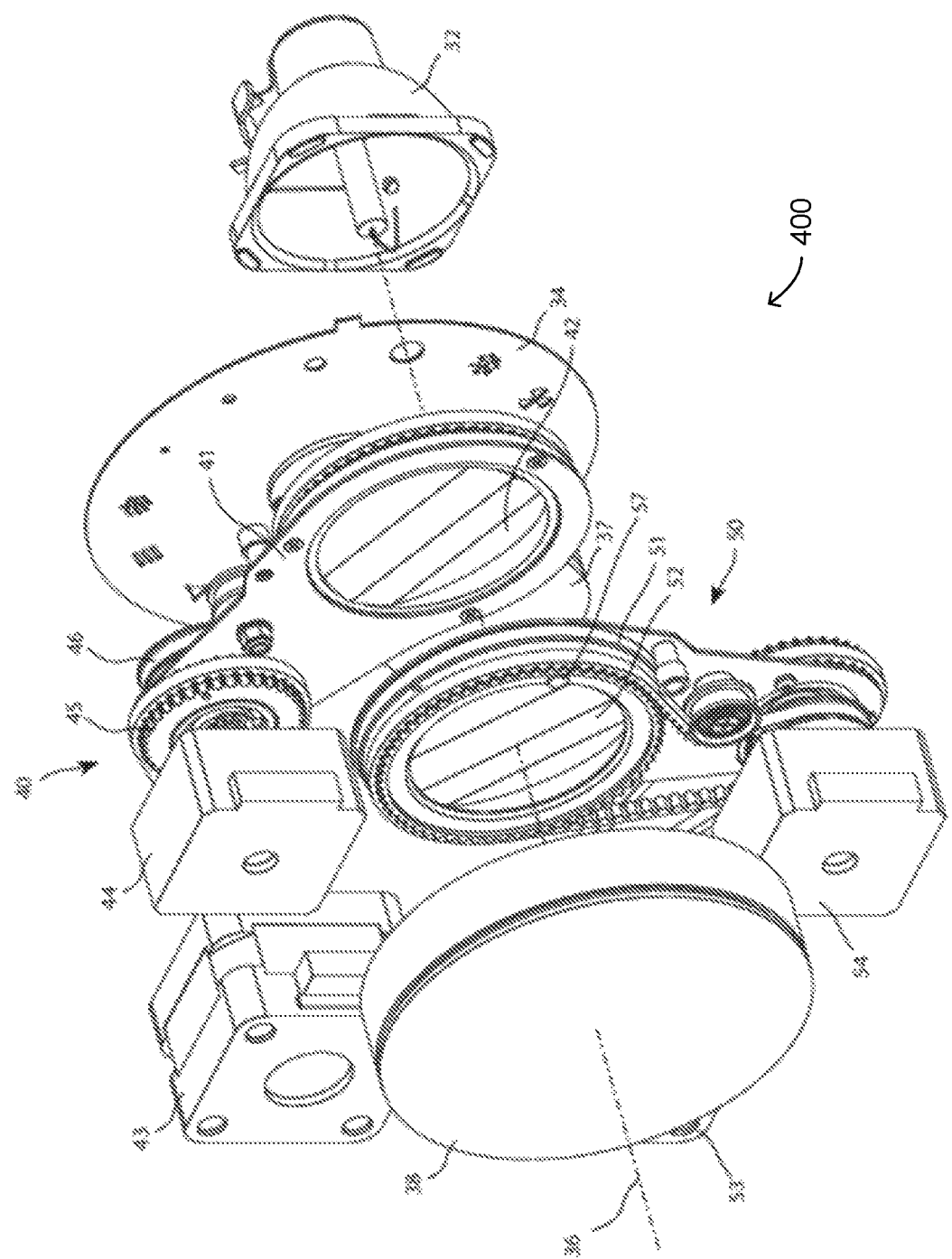
FIG. 6 illustrates the first coordinated effects system of FIG. 4 in a third configuration.

FIG. 6 illustrates the first coordinated effects system 400 in a third configuration. In FIG. 6, the motor 53 has been operated from the configuration shown in FIG. 4 to rotate the second prism arm 51, and thus the second prism 52 has been inserted into the light beam. The first prism 42 remains outside light beam. In this configuration, the second prism 52 alone will produce an effect in the light beam. The second prism 52 may be rotated within the light beam by the motor 54, producing effects similar to those illustrated in FIGS. 2 and 3.

Figure 7:
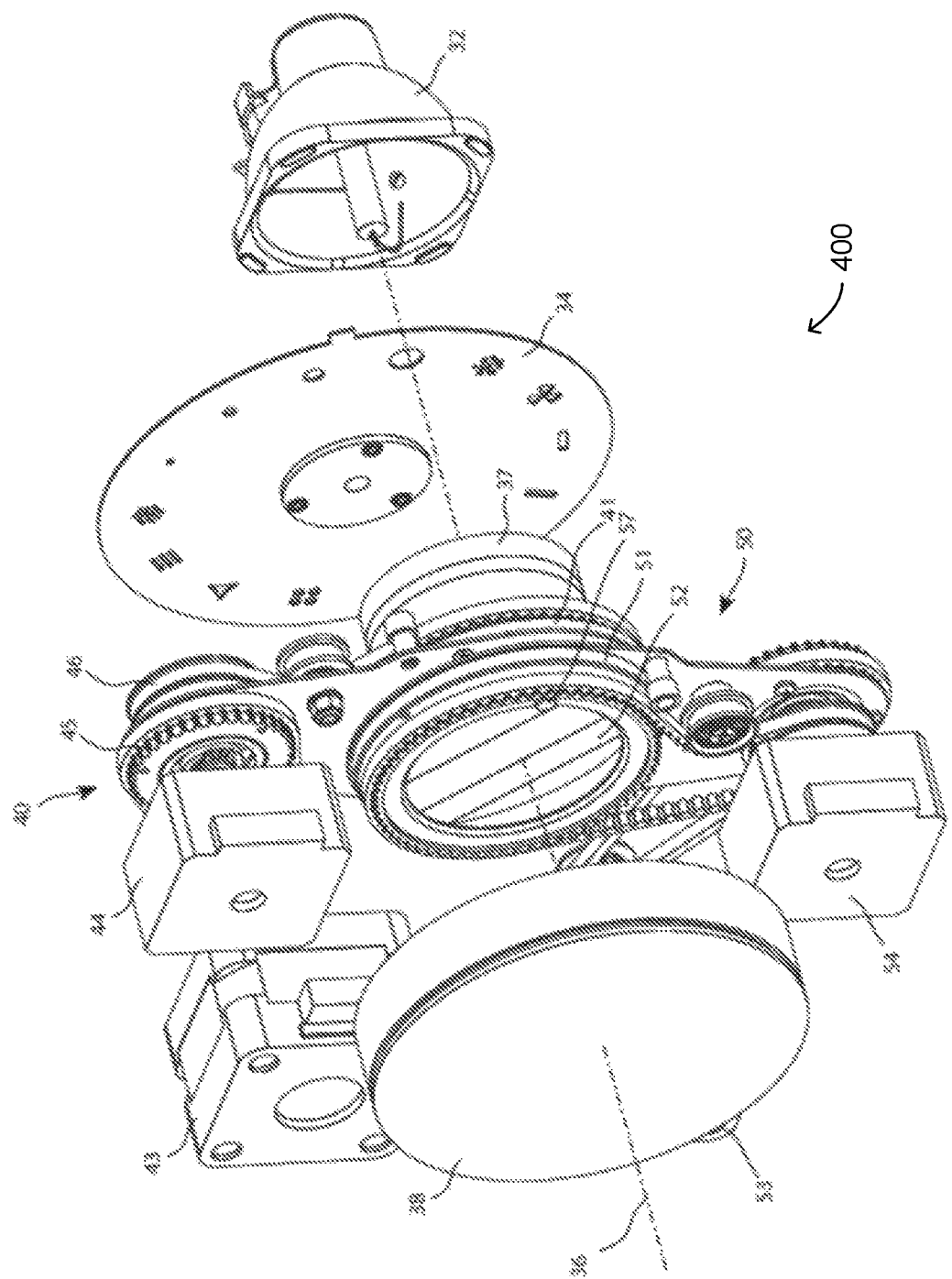
FIG. 7 illustrates the first coordinated effects system of FIG. 4 in a fourth configuration.

FIG. 7 illustrates the first coordinated effects system 400 in a fourth configuration. In FIG. 7, the motor 43 has been operated from the configuration shown in FIG. 4 to rotate the first prism arm 41, and thus the first prism 42 has been inserted across the light beam. Further, motor 53 has also been operated to rotate the second prism arm 51, and thus the second prism 52 has been inserted into the light beam. In this position both the first prism 42 and the second prism 52 will produce effects in the light beam. The first prism 42 and the second prism 52 may be rotated while in the light beam by the motors 44 and 54, respectively. The second prism 52 receives the light beam after it has passed through, and been affected by, the first prism 42. Thus, the effect produced by the first prism 42 is then further modified by the second prism 52.

Figure 8:
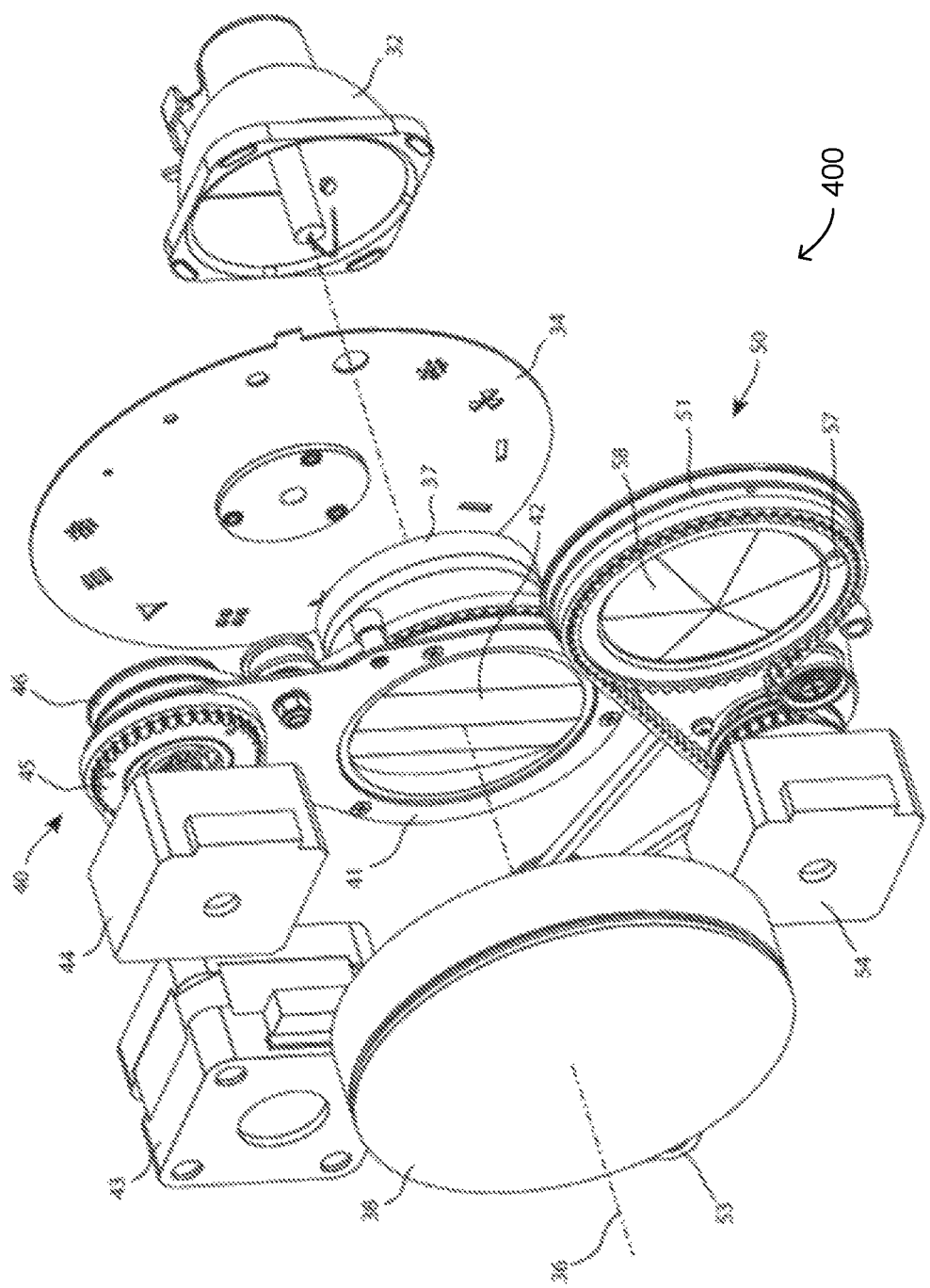
FIG. 8 illustrates the first coordinated effects system of FIG. 4 in the second configuration with an alternative second prism.

FIG. 8 illustrates the first coordinated effects system 400 in the second configuration with an alternative second prism 58. Similarly, first prism 42 may be replaced with alternative prism designs.

Figure 9:
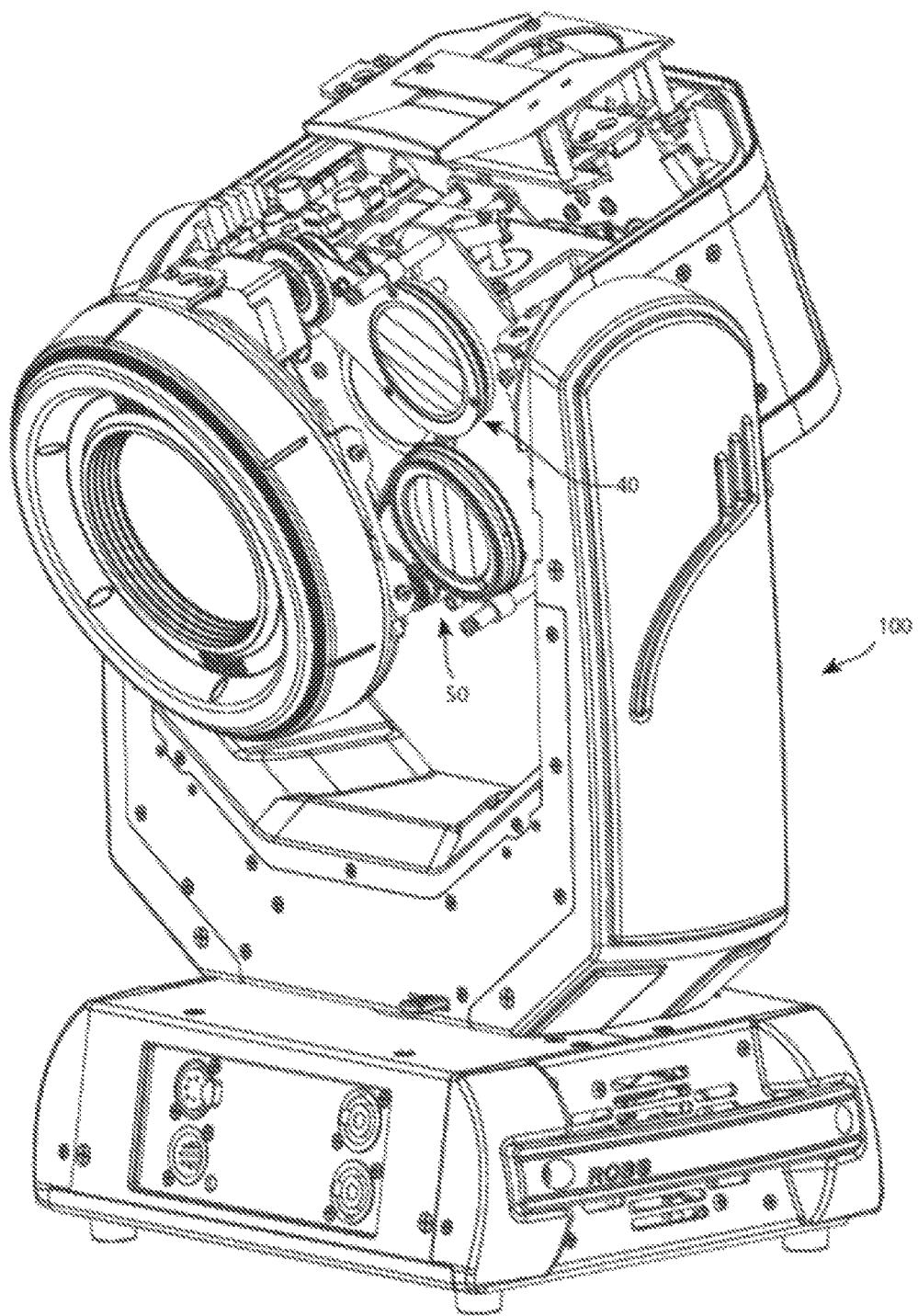
FIG. 9 illustrates an automated luminaire according to the disclosure, fitted with the first coordinated effects system of FIG. 4.

FIG. 9 illustrates an automated luminaire 100 according to the disclosure, fitted with the first prism system 40 and the second prism system 50.

Figure 10:
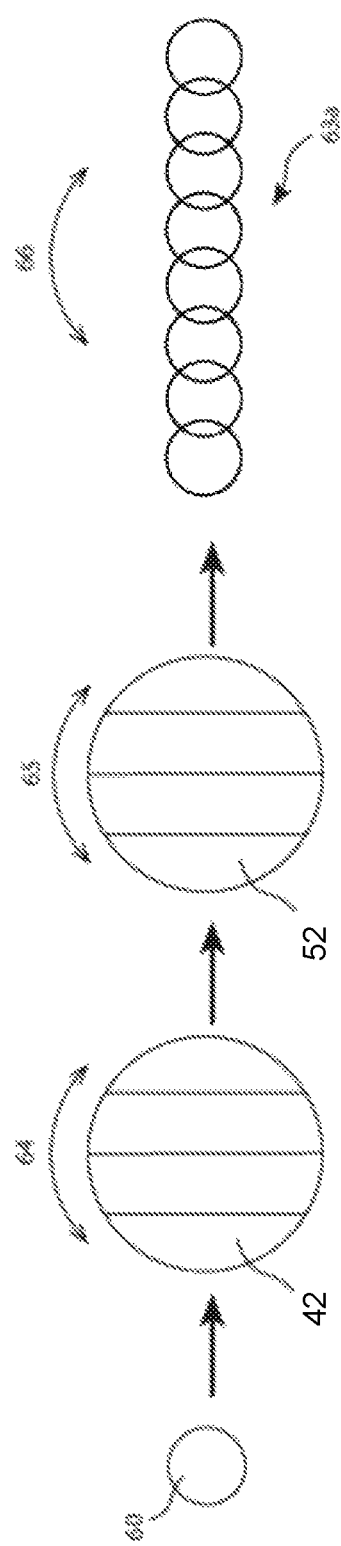
FIG. 10 illustrates an effect of the first coordinated effects system of FIG. 4 in the fourth configuration with prisms of the first coordinated effects system in a first position relative to each other.
Figure 11:
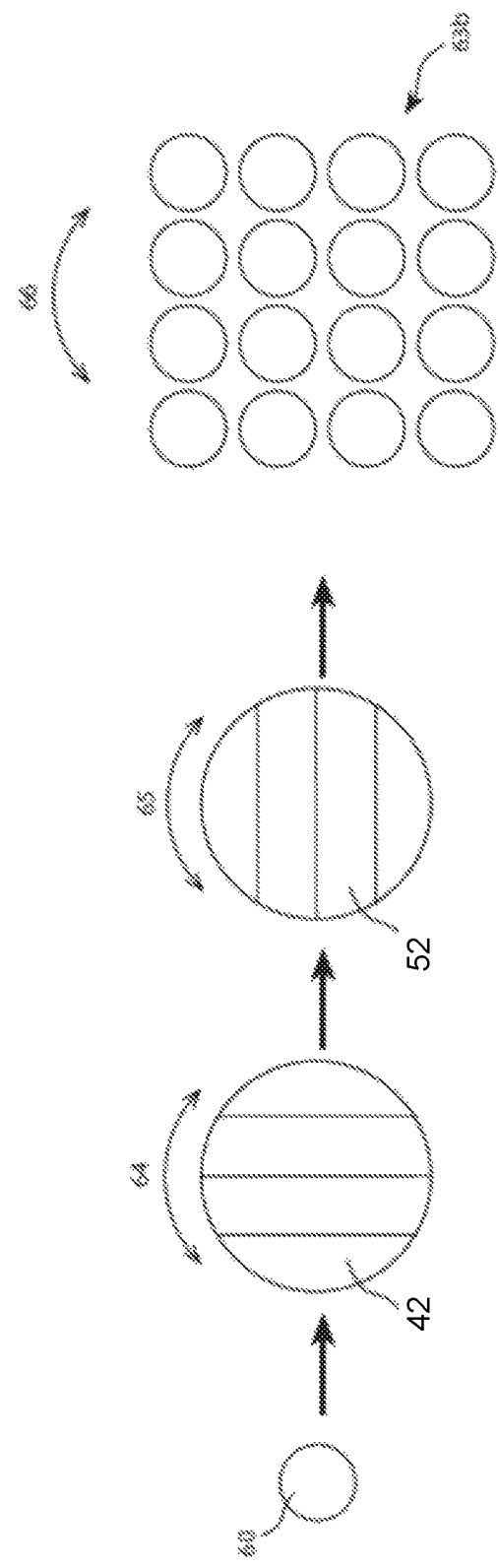
FIG. 11 illustrates an effect of the first coordinated effects system of FIG. 4 in the fourth configuration with prisms of the first coordinated effects system in a second position relative to each other.

FIGS. 10 and 11 illustrate effects of the first coordinated effects system 400 in the fourth configuration. FIG. 10 illustrates an effect of the first coordinated effects system 400 with the first prism 42 and the second prism 52 in a first position relative to each other. A single image 60 produced by beam color, size, shape, and pattern optical systems of the automated luminaire 100 passes through first prism 42 and second prism 52, resulting in multiple copies of the image 60 as output image 63*a*. Image 60 is here shown for clarity as a simple circular image, however image 60 may be any complex image as produced by the automated luminaire, in particular it may have a shape defined by the patterns or gobos in the optical train.

Because the first prism 42 and the second prism 52 are both linear prisms and are aligned in a parallel manner, the resulting output image 63*a* is also linearly aligned. However, both first prism 42 and second prism 52 may be rotated independently, as indicated by arcs 64 and 65, respectively, causing a change in pattern and rotation (as indicated by arc 66) in the output image 63*a*. For example, if the first prism 42 and second prism 52 are rotated in the same direction at the same speed, maintaining their rotational alignment, the output image 63*a* will maintain its shape and rotate.

FIG. 11 illustrates an effect of the first coordinated effects system 400 in the fourth configuration with the first prism 42 and the second prism 52 of the first coordinated effects system 400 in a second position relative to each other. The first prism 42 remains in the same position as in FIG. 10; however, the second prism 52 has been rotated 90° to a new position orthogonal to its position in FIG. 10. In this configuration, the linear effect of the first prism 42 still forms a single linear array of the image 60; however, the second prism 52 now acts on that first linear array in an orthogonal direction, resulting in an output image 63*b* that is a matrix array of the linear array produced by the first prism 42. As described with reference to FIG. 10, if the first prism 42 and second prism 52 are rotated in the same direction at the same speed, maintaining their rotational alignment, the output image 63*b* will rotate while maintaining its shape.

Intermediate angles between the first prism 42 and the second prism 52 to the angles shown in FIGS. 10 and 11 will produce output images intermediate between output images 63*a* and 63*b* that change shape and configuration smoothly as the angle between the first prism 42 and the second prism 52 changes. If the angle changes slowly, the variation in the output images also changes slowly. Similarly, if the angle changes quickly, the variation in the output images also changes quickly.

The first prism 42 and the second prism 52 may be simultaneously rotated in a coordinated manner, such that the angle between them remains constant. For example, both prisms may be rotated in the same direction at the same speeds, thus maintaining the difference in angle between them. This results in an output image that remains static and rotates at the same rate as the prisms. In some embodiments, such rotation may be performed without information received from sensors fitted to the first prism 42 and the second prism 52. In other embodiments, the sensors fitted to the first prism 42 and the second prism 52 enable the control system of the automated luminaire 100 to maintain improved coordination in the rotation and positioning of the prisms. The first prism 42 and the second prism 52 may be simultaneously rotated in a coordinated manner at differing speeds and/or in differing directions, resulting in output images that change and/or rotate. Either or both of the first prism 42 and the second prism 52 may be rotated while the other is held static (i.e., at a rotational speed of zero). Speeds and rotation directions and positions may be accurately controlled through the sensors to produce accurate and repeatable coordinated effects in the output images.

Figure 12:
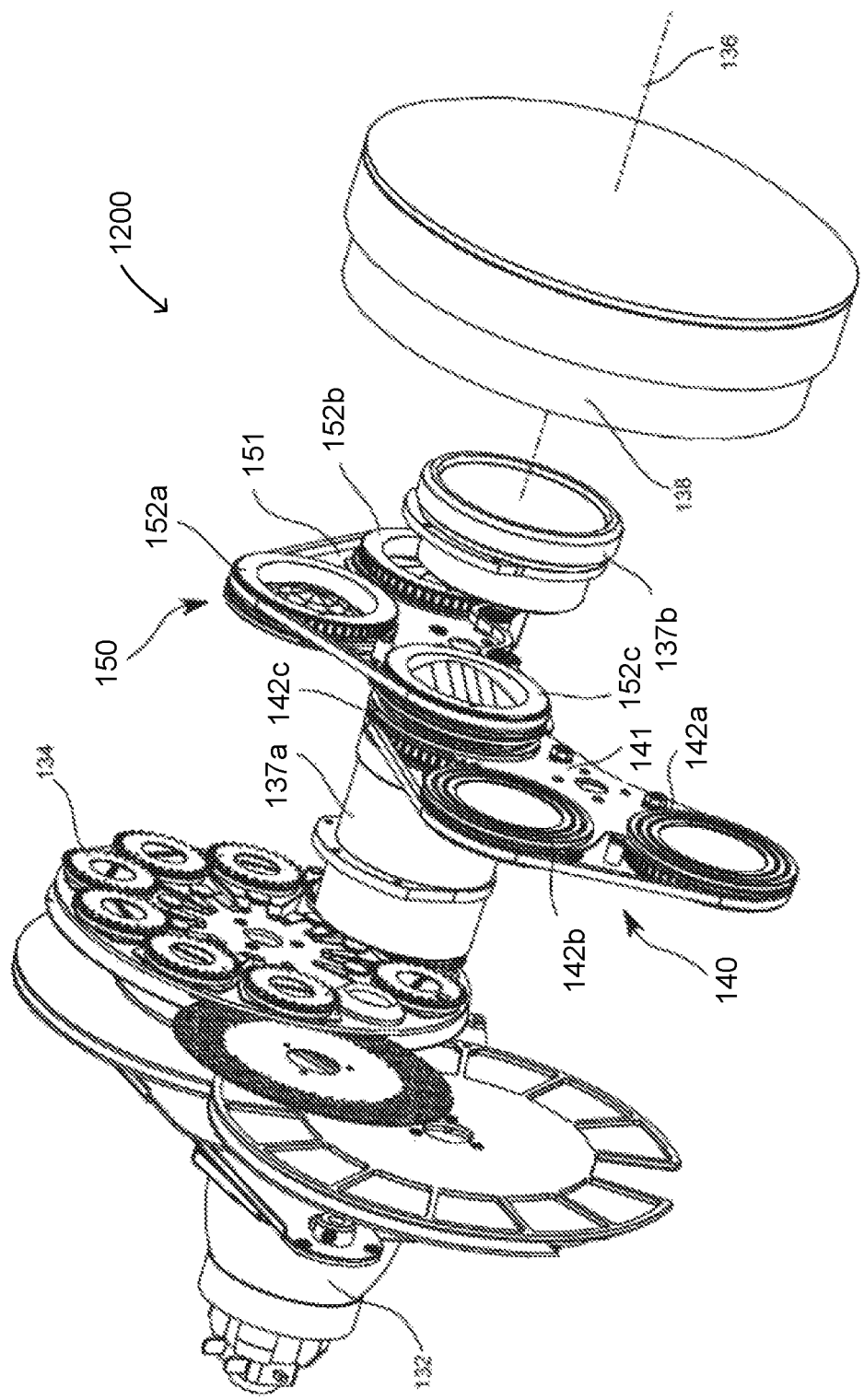
FIG. 12 illustrates an optical system including a second coordinated effects system according to the disclosure in a first configuration.

FIG. 12 illustrates an optical system including a second coordinated effects system 1200 according to the disclosure in a first configuration. A light source 132 produces a light beam whose optical axis is shown by dotted line 136. The light beam passes through a gobo wheel 134 and optical lenses 137*a*, 137*b*, and 138 before being emitted from the luminaire. The optical system is shown here much simplified for clarity and, in practice, the automated luminaire may include further optical devices including but not restricted to a color wheel, a color mixing mechanism, a rotating gobo, an effects wheel, an iris, a framing shutters mechanism, and other optical devices as known in the art.

The second coordinated effects system 1200 includes a first prism system 140. The first prism system 140 comprises a prism 142*a*, a prism 142*b*, and a prism 142*c*, all rotatably mounted to a first prism support (or arm) 141. A motor (not shown) is configured to rotate the prisms 142*a*, 142*b*, and 142*c* within the first prism support 141. A second motor (not shown) is configured to rotate the first prism support 141 to insert one of the prisms 142*a*, 142*b*, or 142*c* into the light beam, or to remove all three prisms from the light beam. The motors may be operated in a coordinated manner such that one of the prisms 142*a*, 142*b*, and 142*c* is inserted or removed from the light beam and rotated within the light beam, as desired by the operator. The motors (or actuators) may be of a type selected from, but not restricted to, stepper motor, servo-motor, actuator, solenoid, and other motor types as known in the art. In the configuration shown in FIG. 12, the prisms 142*a* and 142*b* are positioned outside of light beam and will have no effect on the exiting light beam, while the prism 142*c* is positioned in the light beam.

The second coordinated effects system 1200 further includes a second prism system 150. The second prism system 150 comprises a prism 152a, a prism 152b, and a prism 152c rotatably mounted to a second prism support (or arm) 151. A third motor (not shown) is configured to rotate the prisms 152a, 152b, and 152c within the second prism support 151. A fourth motor (not shown) is configured to rotate the second prism support 151 to insert one of the prisms 152a, 152b, or 152c into the light beam, or to remove all three prisms from the light beam. The motors may be operated in a coordinated manner such that one of the prisms 152a, 152b, and 152c is inserted or removed from the light beam and rotated within the light beam, as desired by the operator. The motors (or actuators) may be of a type selected from, but not restricted to, stepper motor, servo-motor, actuator, solenoid, and other motor types as known in the art. In the configuration shown in FIG. 12, the prisms 152a and 152b are positioned outside of light beam and will have no effect on the exiting light beam, while the prism 152c is positioned into the light beam. In these positions the prism 142c and the prism 152c are both positioned in the light beam and will interact to produce results similar to those shown in FIGS. 2, 3, 10, and 11.

In the first configuration of the second coordinated effects system 1200, the prism 142c of the first prism system 140 is positioned in the light beam produced by the light source 132. The prism 152c of the second prism system 150 is positioned in the light beam as modified by the first prism system 140. As described with reference to FIGS. 10 and 11, the prism 142c produces a first effect in the light beam (or modified image) and the prism 152c produces a second effect in the light beam as modified by the prism 142c, resulting in an output image.

The ability to position selected prisms from one or both of the first prism system 140 and the second prism system 150 in the light beam, and to selectively rotate either or both of the selected prisms enables an operator of an automated luminaire according to the disclosure to concatenate the effects of the selected prisms and to selectively and cooperatively coordinate the insertion and rotation of the selected prisms to produce new dynamic lighting effects.

When the second coordinated effects system 1200 is in a configuration similar to that shown in FIG. 6 (i.e., with the prisms of the first prism system 140 removed from the light beam and a prism from the second prism system 150 positioned in the light beam), the prism from the second prism system 150 is still characterized for purposes of this disclosure as receiving the light beam as modified by the first prism system 140.

Either or both of the first prism system 140 and the second prism system 150 may further include sensors such that the control system of the automated luminaire is able to detect and control the orientation and/or rotation of the prisms 142a, 142b, or 142c and the prisms 152a, 152b, or 152c. For example, each of the prisms may be fitted with magnets in their respective peripheries that rotate with them. A corresponding sensor or sensors (not shown) such as a Hall effect sensor in the first prism system 140 and the second prism system 150 may detect the position of the magnets, and thus deduce the rotational position of the prisms.

The sensors are not restricted to a magnet and Hall effect sensor, and any sensing system may be utilized in other embodiments of the disclosure, including, but not restricted to, magnetic sensors, optical sensors, switch sensors. In some embodiments, a single sensor may be used for each of the first prism system 140 and the second prism system 150, mounted in positions that permit them to sense whichever of the prisms of the first prism system 140 and/or the second prism system 150 are positioned in the light beam.

While the prism systems 140 and 150 are described as each comprising a single motor that rotates all three prisms in its prism system, it will be understood that in other embodiments a prism system according to the disclosure may include one or more actuators to individually rotate one or more associated prisms in the prism system.

Figure 13:
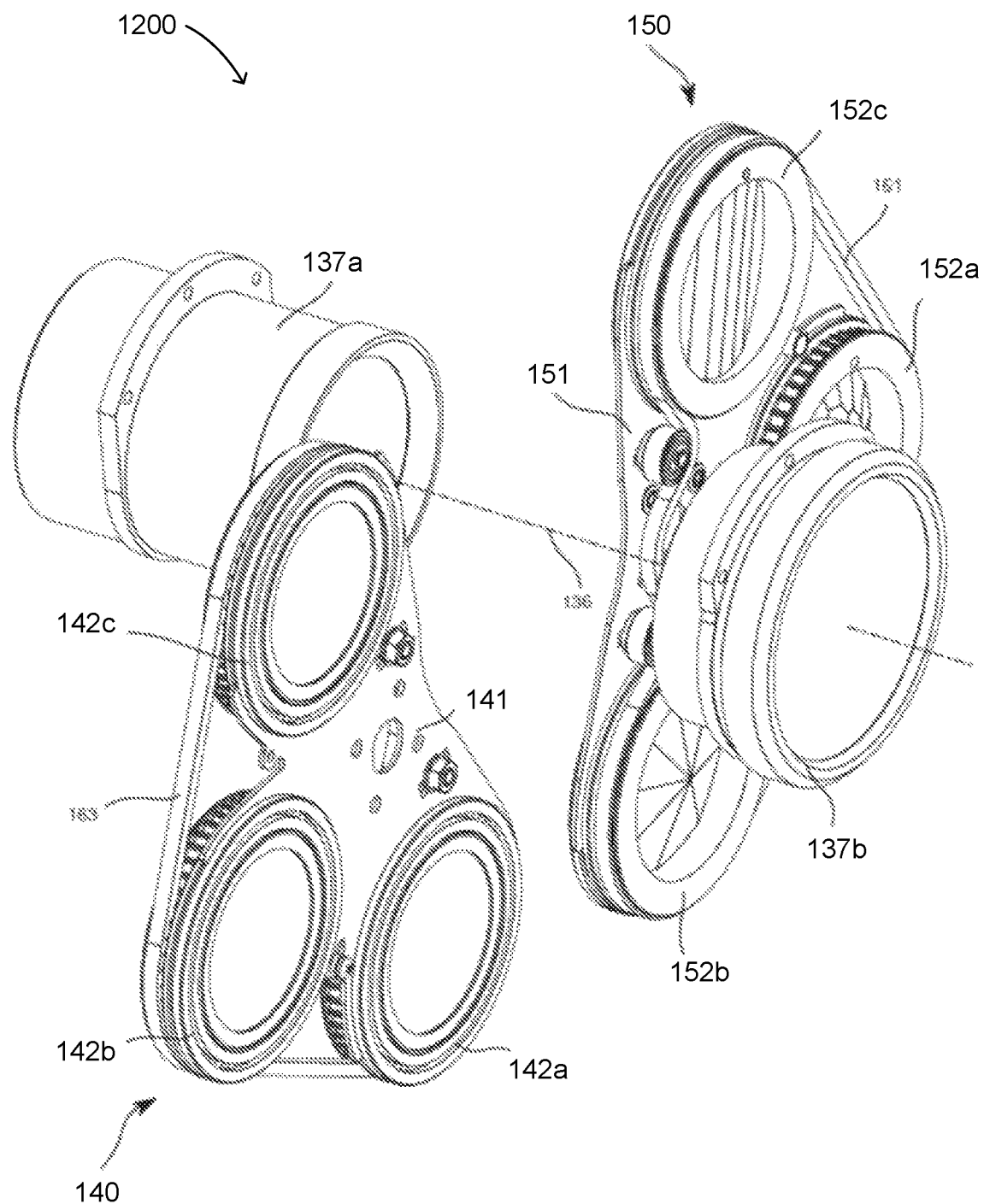
FIG. 13 presents a simplified view of the second coordinated effects system of FIG. 12 in a second configuration.

FIG. 13 presents a simplified view of the second coordinated effects system 1200 of FIG. 12 in a second configuration. In FIG. 13 both first prism support 141 and second prism support 151 have been rotated to remove all prisms from the light beam. A first motor (not shown) is configured to rotate the prisms 152a, 152b, or 152c within the second prism support 151 via a belt 161. A second motor (not shown) is configured to rotate the prisms 142a, 142b, or 142c within the first prism support 141 via a belt 163.

Figure 14:
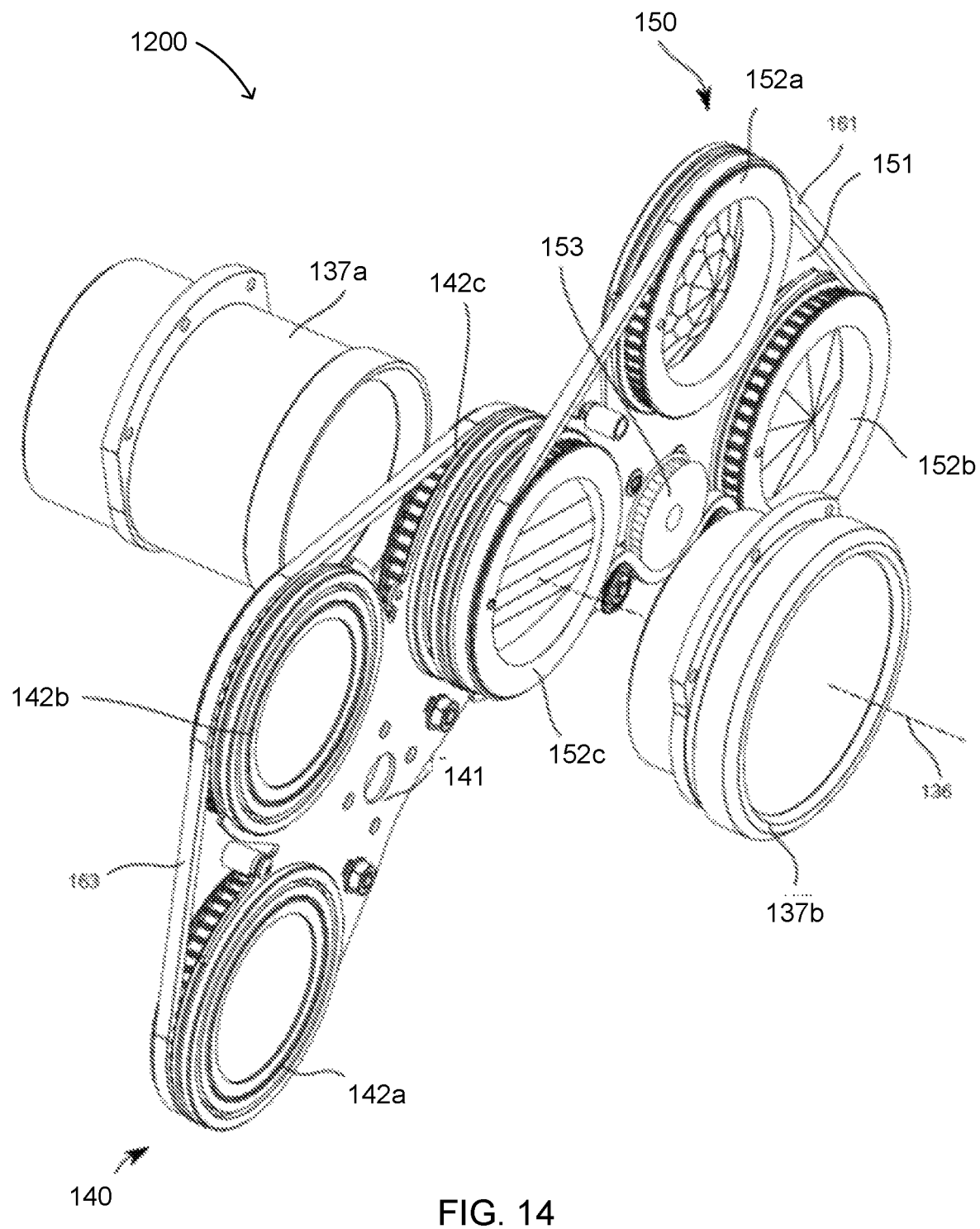
FIG. 14 presents a simplified view of the second coordinated effects system of FIG. 12 in the first configuration.

FIG. 14 presents a simplified view of the second coordinated effects system 1200 of FIG. 12 in the first configuration. In the first configuration, the first prism support 141 and the second prism support 151 have been rotated from their positions in the second configuration shown in FIG. 13 to insert both the prism 142c and the prism 152c into the light beam. In this first configuration, the prisms will interact to produce results similar to those shown in FIGS. 2, 3, 10, and 11.

FIG. 14 shows a pulley 153 that is coupled to and driven by the first motor described with reference to FIG. 13. The pulley 153 engages the belt 161 and causes the prisms 152a, 152b, or 152c to rotate within the second prism support 151.

Although embodiments with two prism systems have been illustrated and described, in other embodiments any number of prism systems may be utilized to produce complex coordinated effects. Each of the multiple prism systems may be fitted with any number of prisms.

Figure 15:
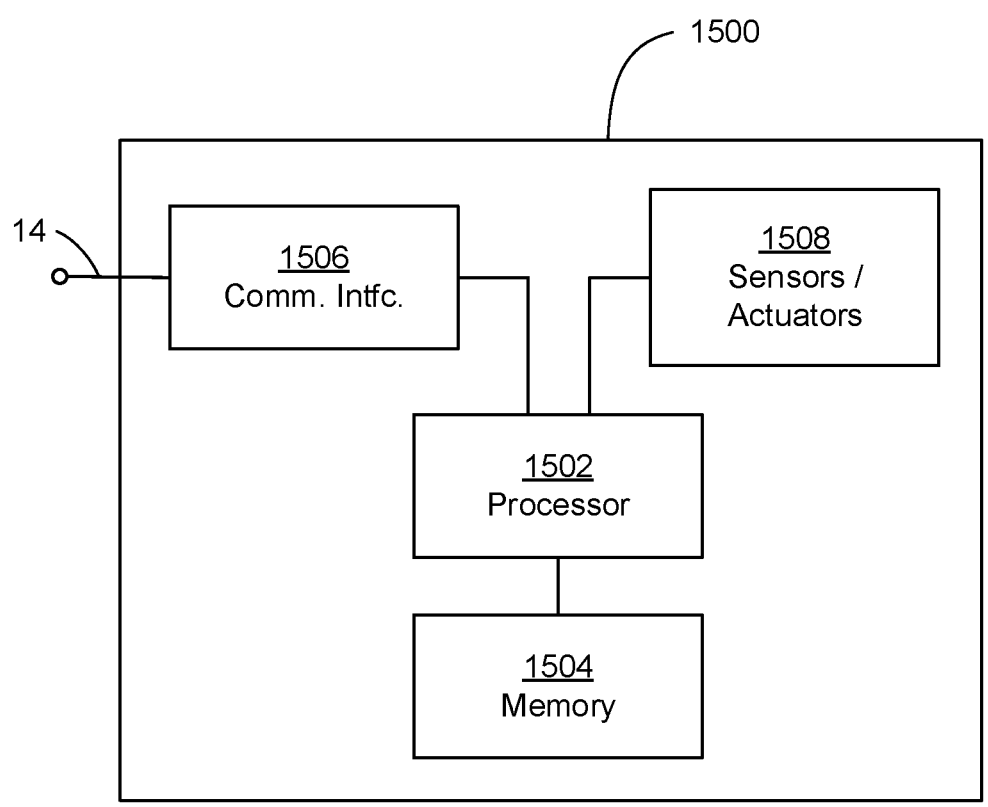
FIG. 15 presents a block diagram of a control system for an automated luminaire according to the disclosure.

FIG. 15 presents a block diagram of a control system (or controller) 1500 for an automated luminaire 12 according to the disclosure. The control system 1500 is suitable for controlling the coordinated effects systems 400 and 1200 described with reference to FIGS. 4-8 and 12-14, respectively. The control system 1500 is also suitable for controlling other control functions of the automated luminaire 100, described with reference to FIG. 9. The control system 1500 includes a processor 1502 electrically coupled to a memory 1504. The processor 1502 is implemented by hardware and software. The processor 1502 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 1502 is further electrically coupled to and in communication with a communication interface 1506. The communication interface 1506 is coupled to, and configured to communicate via, the data link 14. The processor 1502 is also coupled via a control interface 1508 to one or more other sensors, motors, actuators, controls and/or other devices. The processor 1502 is configured to receive control signals via the communication interface 1506 and to control the coordinated effects systems 400 and 1200 and other mechanisms of the automated luminaire 100 via the control interface 1508.

The control system 1500 is suitable for implementing processes, coordinated effects control, and other functionality as disclosed herein, which may be implemented as instructions stored in the memory 1504 and executed by the processor 1502. The memory 1504 comprises one or more disks, tape drives, and/or solid-state drives and may be used as an over-flow data storage device, to store programs when such programs are selected for execution, and to store instructions and data that are read during program execution. The memory 1504 may be volatile and/or non-volatile and may be read-only memory (ROM), random access memory (RAM), ternary content-addressable memory (TCAM), and/or static random-access memory (SRAM).

While the disclosure has been described with respect to a limited number of embodiments, those skilled in the art, having benefit of this disclosure, will appreciate that other embodiments may be devised which do not depart from the scope of the disclosure herein. While the disclosure has been described in detail, it should be understood that various changes, substitutions and alterations can be made hereto without departing from the spirit and scope of the disclosure.

What is claimed is:

1. A coordinated effects system, comprising:
   a first prism system comprising a first plurality of prisms,
      the first prism system configured to be moved to first and second positions, in the first position a selected one of the first plurality of prisms being positioned in a light beam passing through the first prism system, and in the second position all of the first plurality of prisms being removed from the light beam passing through the first prism system,
      the first prism system further comprising a first stepper motor and a first sensor, the first stepper motor configured to rotate the selected one of the first plurality of prisms, and the first sensor configured to detect an orientation of the selected one of the first plurality of prisms in the first position;
   a second prism system optically coupled to the first prism system and comprising a second plurality of prisms,
      the second prism system configured to be moved to third and fourth positions, in the third position a selected one of the second plurality of prisms being positioned in the light beam passing through the first prism system, and in the fourth position all of the second plurality of prisms being removed from the light beam passing through the first prism system,
      the second prism system further comprising a second stepper motor and a second sensor, the second stepper motor configured to rotate the selected one of the second plurality of prisms, and the second sensor configured to detect an orientation of the selected one of the second plurality of prisms in the third position; and
   a control system coupled to the first and second stepper motors and the first and second sensors and configured to use the first and second sensors to control, simultaneously and in a coordinated manner, rotation directions, rotation speeds, and rotational positions of the selected one of the first plurality of prisms and the selected one of the second plurality of prisms.

2. The coordinated effects system of claim 1, wherein at least one of the first prism system and the second prism system is configured to rotate all of the associated plurality of prisms simultaneously.

3. The coordinated effects system of claim 1, wherein:
   the first prism system comprises a third stepper motor coupled to the control system and configured to move the first prism system from the second position to the first position; and
   the second prism system comprises a fourth stepper motor coupled to the control system and configured to move the second prism system from the fourth position to the third position.

4. The coordinated effects system of claim 1, wherein at least one of the first prism system and the second prism system comprises:
   an arm configured to move the first prism system from the second position to the first position; and
   an actuator mechanically coupled to the arm and electrically coupled to the control system, the actuator configured to rotate the arm to move the first prism system from the second position to the first position.

5. An automated luminaire, comprising:
   a light source configured to emit a light beam;
   an optical device coupled to the light source and configured to produce a first image in the light beam;
   a first prism system optically coupled to the optical device and comprising a first plurality of prisms,
      the first prism system configured to be moved to first and second positions, in the first position a selected one of the first plurality of prisms being positioned in the light beam, and in the second position all of the first plurality of prisms being removed from the light beam,
      the first prism system further comprising a first stepper motor and a first sensor, the first stepper motor configured to rotate the selected one of the first plurality of prisms to produce a modified image from the image, and the first sensor configured to detect an orientation of the selected one of the first plurality of prisms in the first position;
   a second prism system optically coupled to the first prism system and comprising a second plurality of prisms,
      the second prism system configured to be moved to third and fourth positions, in the third position a selected one of the second plurality of prisms being positioned in the light beam, and in the fourth position all of the second plurality of prisms being removed from the light beam,
      the second prism system further comprising a second stepper motor and a second sensor, the second stepper motor configured to rotate the selected one of the second plurality of prisms to produce an output image from the modified image, and the second sensor configured to detect an orientation of the selected one of the second plurality of prisms in the third position; and
   a control system coupled to the first and second stepper motors and the first and second sensors and configured to use the sensing system to control, simultaneously and in a coordinated manner, rotation directions, rotation speeds, and rotational positions of the selected one of the first plurality of prisms and the selected one of the second plurality of prisms.

6. The automated luminaire of claim 5, wherein the control system is configured to:
   control rotation of the selected one of the first plurality of prisms and rotation of the selected one of the second plurality of prisms based on signals received from the first and second sensors, respectively.

7. The automated luminaire of claim 6, wherein the control system is configured to rotate one of the selected one of the first plurality of prisms and the selected one of the second plurality of prisms while not rotating the other one of the selected one of the first plurality of prisms and the selected one of the second plurality of prisms.

8. The automated luminaire of claim 6, wherein the control system is configured to rotate the selected one of the first plurality of prisms and the selected one of the second plurality of prisms in the same direction at the same speed and maintain a desired rotational alignment between the selected one of the first plurality of prisms and the selected one of the second plurality of prisms.

9. The automated luminaire of claim 5, wherein the control system is configured to rotate the selected one of the first plurality of prisms and the selected one of the second plurality of prisms in opposite directions.

10. The automated luminaire of claim 5, wherein the control system is configured to rotate the selected one of the first plurality of prisms at a first speed and the selected one of the second plurality of prisms at a second speed.

11. The automated luminaire of claim 5, wherein the control system comprises a communication interface and the control system is configured to control the first prism system and the second prism system in response to control signals received via the communication interface.

* * * * *